(12) United States Patent
Shimizu et al.

(10) Patent No.: US 7,951,034 B2
(45) Date of Patent: May 31, 2011

(54) HYDRAULIC CONTROL APPARATUS FOR AUTOMATIC TRANSMISSION

(75) Inventors: Tetsuya Shimizu, Anjo (JP); Kenichi Tsuchida, Anjo (JP); Masamichi Yamaguchi, Anjo (JP); Satoshi Nishio, Hekinan (JP); Akitomo Suzuki, Anjo (JP); Kazunori Ishikawa, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 373 days.

(21) Appl. No.: 12/292,927

(22) Filed: Dec. 1, 2008

(65) Prior Publication Data

US 2009/0143181 A1 Jun. 4, 2009

(30) Foreign Application Priority Data

Nov. 30, 2007 (JP) .................................. 2007-311253

(51) Int. Cl.
  *F16H 31/00* (2006.01)
(52) U.S. Cl. ...................................................... 475/120
(58) Field of Classification Search .................... 475/120
  See application file for complete search history.

(56) References Cited

U.S. PATENT DOCUMENTS

| | | | | |
|---|---|---|---|---|
| 5,895,334 | A * | 4/1999 | Yu | 475/128 |
| 5,947,856 | A | 9/1999 | Tabata et al. | |
| 7,485,062 | B2 * | 2/2009 | Botosan et al. | 475/127 |
| 7,625,313 | B2 * | 12/2009 | Kondo et al. | 477/144 |
| 2007/0161448 | A1 | 7/2007 | Sato et al. | |
| 2007/0161449 | A1 | 7/2007 | Hayashi et al. | |
| 2007/0167283 | A1 | 7/2007 | Sato et al. | |

FOREIGN PATENT DOCUMENTS

| | | |
|---|---|---|
| JP | A-7-19326 | 1/1995 |
| JP | A-10-73158 | 3/1998 |
| JP | A-2007-177934 | 7/2007 |

* cited by examiner

*Primary Examiner* — Dirk Wright
(74) *Attorney, Agent, or Firm* — Oliff & Berridge, PLC

(57) ABSTRACT

In a condition of a vehicle which remains stationary or is about to stop and of a forward second speed having a clutch and a brake engaged, an N range is changed from a D range based on a shift lever operation and a forward range pressure is discharged from a manual shift valve. At this time, an orifice and a check ball are used to delay discharge of oil paths which communicate with a linear solenoid valve relative to discharge of an oil path a1 which communicates with a linear solenoid valve. Specifically, release of the brake is delayed relative to release of the clutch, so that a shift by way of a forward first speed through engagement of a one-way clutch can be prevented.

8 Claims, 5 Drawing Sheets

FIG. 2

|   | C-1 | C-2 | C-3 | B-1 | B-2 | F-1 |
|---|---|---|---|---|---|---|
| P |   |   |   |   |   |   |
| REV |   |   | ○ |   | ○ |   |
| N |   |   |   |   |   |   |
| 1ST | ○ |   |   |   | (○) | ○ |
| 2ND | ○ |   |   | ○ |   |   |
| 3RD | ○ |   | ○ |   |   |   |
| 4TH | ○ | ○ |   |   |   |   |
| 5TH |   | ○ | ○ |   |   |   |
| 6TH |   | ○ |   | ○ |   |   |

※ (○) : ENGINE BRAKE IN OPERATION

HYDRAULIC CONTROL APPARATUS FOR AUTOMATIC TRANSMISSION

INCORPORATION BY REFERENCE

The disclosure of Japanese Patent Application No. 2007-311253 filed on Nov. 30, 2008 including the specification, drawings and abstract is incorporated herein by reference in its entirety.

BACKGROUND OF THE INVENTION

1. Field of the Invention

The present invention relates to hydraulic control apparatuses for automatic transmissions mounted in, for example, vehicles and, in particular, to a hydraulic control apparatus for an automatic transmission having a low speed achieved by engagement of a one-way clutch, forming a neutral condition by discharging a hydraulic pressure when a shift lever operation is performed to change from a forward range of a lower medium speed condition to another shift range.

2. Description of the Related Art

A multi-stage automatic transmission mounted in, for example, vehicles generally forms a shift speed by controlling a rotating condition of each of rotating elements in a speed change gear mechanism that combines together the rotating elements including, for example, a planetary gear. The multi-stage automatic transmission controls the rotating condition of the rotating elements through selective hydraulic engagement of a plurality of clutches or brakes, thereby enabling control of multiple shift speeds.

Among such automatic transmissions, some achieve a forward first speed by engaging an input clutch (C-1) with a one-way clutch (F-1), in addition to engagement of the clutches and brakes (see, for example, Japanese Patent Publication Application No. JP-A-2007-177934 which is hereinafter referred to as Patent Document 1). The one-way clutch performs a smooth automatic engagement to lessen an engagement shock particularly when the forward first speed during a change from a neutral range to a forward range is achieved.

A hydraulic control apparatus used in the automatic transmission includes a solenoid valve regulating and controlling an engagement pressure supplied to a hydraulic servo of the clutches and brakes and a manual shift valve allowing a spool position to be changed based on the shift lever operation. Specifically, the manual shift valve allows supply and discharge of a source pressure (a forward range pressure or a reverse range pressure) of the engagement pressure supplied to the hydraulic servo of the clutches and brakes to be collectively controlled. This reliably forms the neutral condition even if, for example, the solenoid valve fails, thus enhancing reliability and safety as the automatic transmission.

There is, however, the following problem. Specifically, a clutch C-1 and a brake B-1 are engaged as in, for example, the forward second speed of Patent Document 1 when an input shaft of the speed change gear mechanism is in a condition of being an idle speed or less as when, for example, the vehicle is stationary or is about to stop. In addition, the manual shift valve is changed from a forward range position to a neutral range position through the shift lever operation, forming a neutral condition by discharging a hydraulic pressure. If the engagement pressure of the brake B-1 is discharged before the engagement pressure of the clutch C-1 under the foregoing condition, the input shaft of the speed change gear mechanism is driven at a higher speed through the idle speed of the engine via, for example, a torque converter. As a result, the one-way clutch is automatically engaged to form, together with the clutch C-1, a forward first speed. Specifically, the forward second speed is changed to the neutral condition via the forward first speed, so that the neutral condition is established after a driving force is transmitted to a drive wheel with amplified torque of a gear ratio being instantaneously the forward first speed. This produces a shift shock not expected by a driver, posing a problem of the driver's not having a good shift feeling.

SUMMARY OF THE INVENTION

In the view of the above, the present invention provides a hydraulic control apparatus for an automatic transmission capable of preventing shock by engagement of a one-way clutch from occurring when a forward range is changed to another shift range based on a shift lever operation in a lower medium speed condition.

According to a first aspect of the present invention, the hydraulic control apparatus for the automatic transmission that achieves a lower medium speed by engaging a first friction engagement element and a second friction engagement element and a low speed lower than the lower medium speed by engaging the first friction engagement element and a one-way clutch, the apparatus includes:

a range pressure generating unit outputting a forward range pressure upon a forward range based on a shift lever operation and discharging the forward range pressure upon another shift range;

a first pressure regulating unit outputting the forward range pressure through pressure regulation to a hydraulic servo of the first friction engagement element;

a second pressure regulating unit outputting the forward range pressure through pressure regulation to a hydraulic servo of the second friction engagement element;

a first oil path providing communication of the forward range pressure of the range pressure generating unit with the first pressure regulating unit;

a second oil path providing communication of the forward range pressure of the range pressure generating unit with the second pressure regulating unit; and a delay mechanism delaying discharge of the second oil path than discharge of the first oil path when the another shift range is changed from the forward range based on the shift lever operation and the range pressure generating unit discharges the forward range pressure.

Accordingly, the delay mechanism delays the discharge of the forward range pressure in the second oil path that provides communication of a hydraulic pressure of the hydraulic servo of the second friction engagement element via the second pressure regulating unit relative to the discharge of the forward range pressure in the first oil path that provides communication of the hydraulic pressure of the hydraulic servo of the first friction engagement element via the first pressure regulating unit. This allows a release of the second friction engagement element to be delayed relative to the release of the first friction engagement element when the range pressure generating unit changes from the forward range to the another shift range based on the shift lever operation particularly in the lower medium speed. This eliminates engagement of the one-way clutch occurring due to the first friction engagement element left engaged when, for example, the second friction engagement element is released before the first friction engagement element. A shift can therefore be made from the lower medium speed without going through the low speed, specifically, from the lower medium speed directly into a neutral range. A shift shock that otherwise occurs when the forward range is changed to another shift range can thereby be prevented, contributing to a better shift feeling.

According to a second aspect of the present invention, the delay mechanism is disposed on the second oil path.

Since the delay mechanism is disposed on the second oil path, the release of the second friction engagement element achieved by discharging the engagement pressure from the second oil path can be delayed relative to the release of the first friction engagement element achieved by discharging the engagement pressure from the first oil path.

According to a third aspect of the present invention, the delay mechanism includes a first orifice and a one-way valve disposed in parallel with the first orifice.

This allows the delay mechanism to be structured to include the first orifice and the one-way valve. Specifically, the release of the second friction engagement element can be delayed relative to the release of the first friction engagement element using a simple mechanical structure. A shift can therefore be made from the lower medium speed directly into the neutral range upon change of another shift range from the forward range, thereby preventing a shift shock from occurring and contributing to a better shift feeling.

According to a forth aspect of the present invention, the first oil path includes a shared oil path connected to the range pressure generating unit and sharing supply and discharge of the hydraulic pressure with the second oil path; and a first non-shared oil path branched from the shared oil path and connected to the first pressure regulating unit;

the second oil path includes the shared oil path; and a second non-shared oil path branched from the shared oil path and connected to the second pressure regulating unit; and the delay mechanism is interposed in the second non-shared oil path.

Accordingly, the delay mechanism is interposed in the second non-shared oil path. This allows the discharge of the hydraulic pressure from the second pressure regulating unit to be delayed relative to the discharge of the hydraulic pressure from the first pressure regulating unit. The release of the second friction engagement element can therefore be delayed relative to the release of the first friction engagement element.

According to a fifth aspect of the present invention, the hydraulic control apparatus further includes:

a second orifice interposed in the shared oil path; and an accumulator disposed on a side closer to the first pressure regulating unit than the second orifice and connected to the shared oil path.

Accordingly, the accumulator is connected to the shared oil path at a point closer to the side of the first pressure regulating unit than the second orifice. Upon change of another shift range from the forward range, therefore, the hydraulic pressure accumulated in the accumulator can prevent, for example, a sudden release shock of the first friction engagement element through a sudden discharge of the forward range pressure. In addition, the release of the second friction engagement element can be delayed relative to the release of the first friction engagement element. While the shock due to sudden release can be prevented, a shift can therefore be made from the lower medium speed directly into the neutral range upon change of another shift range from the forward range. A shift shock can thereby be prevented from occurring, which contributes to a better shift feeling.

BRIEF DESCRIPTION OF THE DRAWINGS

FIG. 2 is an engagement table of an automatic speed change mechanism according to the embodiment of the present invention;

DETAILED DESCRIPTION OF THE PREFERRED EMBODIMENTS

An embodiment of the present invention will be described below with reference to FIGS. 1 through 5.

[General Arrangements of the Automatic Transmission]

Figure 1:
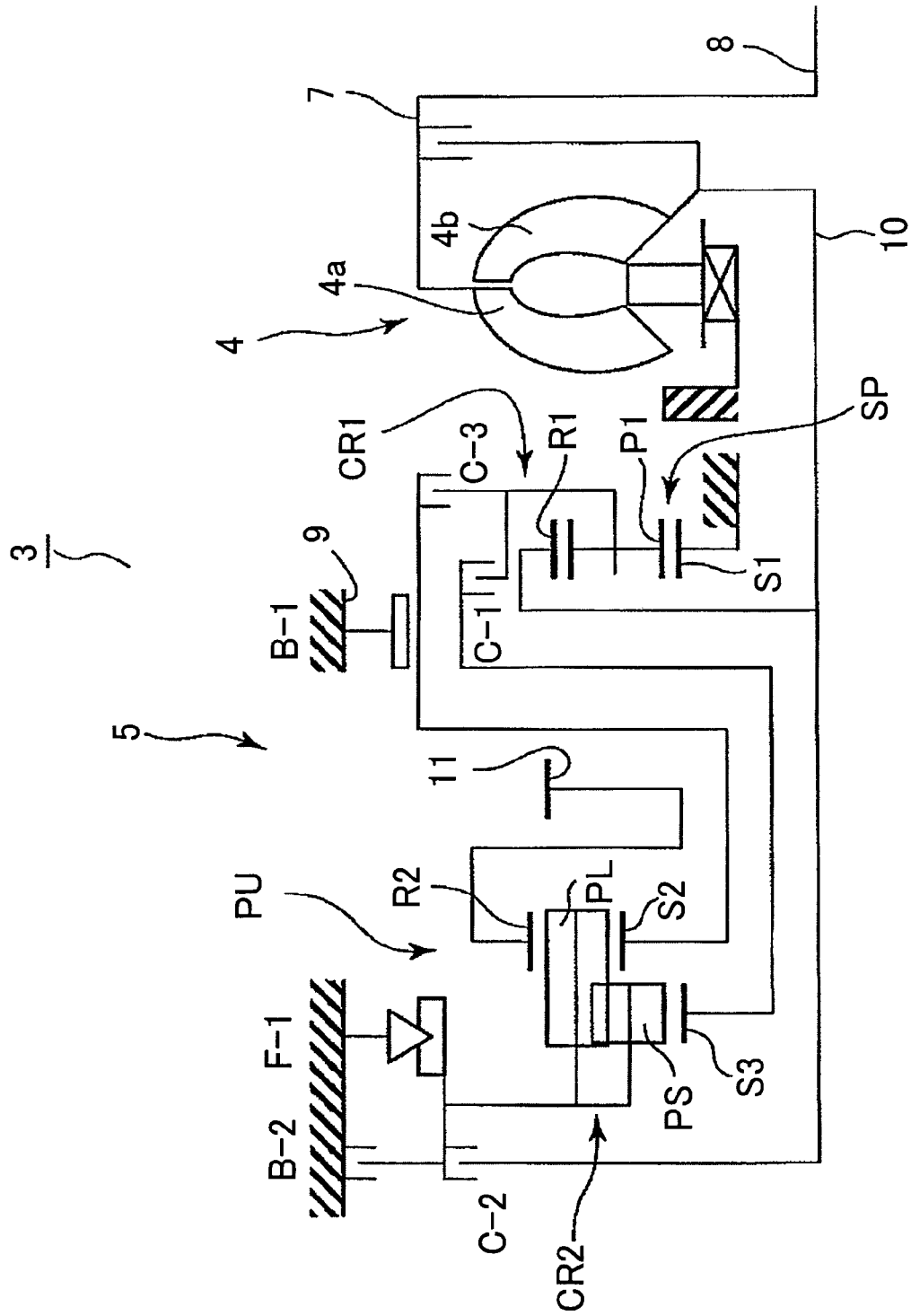
FIG. 1 is a skeleton diagram showing an automatic transmission according to an embodiment of the present invention.

General arrangements of an automatic transmission 3 to which the present invention is applicable will be described with reference to FIG. 1. As shown in FIG. 1, the automatic transmission 3 suitable for use in a vehicle of, for example, an FF type (front engine, front drive) has an input shaft 8 of the automatic transmission to be connected to an engine (not shown), and includes a torque converter 4 and an automatic speed change mechanism 5 disposed about an axis of the input shaft 8.

The torque converter 4 includes a pump impeller 4a connected to the input shaft 8 of the automatic transmission 3 and a turbine runner 4b to which rotation of the pump impeller 4a is transmitted via a hydraulic fluid. The turbine runner 4b is connected to an input shaft 10 of the automatic speed change mechanism 5 disposed coaxially with the input shaft 8. The torque converter 4 has a lock-up clutch 7. When the lock-up clutch 7 is engaged, rotation of the input shaft 8 of the automatic transmission 3 is directly transmitted to the input shaft 10 of the automatic speed change mechanism 5.

The input shaft 10 of the automatic speed change mechanism 5 is mounted with a planetary gear SP and a planetary gear unit PU. The planetary gear SP is what is called a single pinion planetary gear including a sun gear S1, a carrier CR1, and a ring gear R1. The carrier CR1 has a pinion P1 that meshes with the sun gear S1 and the ring gear R1.

The planetary gear unit PU is what is called a Ravigneaux type planetary gear including, as four rotating elements, a sun gear S2, a sun gear S3, a carrier CR2, and a ring gear R2. The carrier CR2 has a long pinion PL that meshes with the sun gear S2 and the ring gear R2 and a short pinion PS that meshes with the sun gear S3, the long pinion PL and the short pinion PS being in mesh with each other.

The sun gear S1 of the planetary gear SP is connected to a boss portion (not shown) integrally fixed to a transmission case (not shown) and is fixed. In addition, the rotation of the ring gear R1 is the same as that of the input shaft 10 (hereinafter referred to as "input rotation"). Further, the carrier CR1 provides a reduced speed rotation that is the input rotation with a reduced speed by the fixed sun gear S1 and the ring gear R1 providing the input rotation. The carrier CR1 is connected to a clutch C-1 and a clutch C-3.

The sun gear S2 of the planetary gear unit PU is fixable relative to the transmission case by being connected to a brake B-1 formed from a band brake. Further, the sun gear S2 is connected to the clutch C-3 such that the reduced speed rotation of the carrier CR1 can be input thereto through the clutch C-3. In addition, the sun gear S3 is connected to the clutch C-1 and the reduced speed rotation of the carrier CR1 can be input thereto.

Additionally, the carrier CR2 is connected to a clutch C-2 to which the rotation of the input shaft 10 is input, so that the input rotation can be input thereto via the clutch C-2. The carrier CR2 is also connected to a one-way clutch F-1 and a brake B-2. Rotation of the carrier CR2 in one direction relative to the transmission case is restricted by the one-way clutch F-1. The rotation of the carrier CR2 is also fixable via the brake B-2. The ring gear R2 is connected to a counter gear 11 which, in turn, is connected to a drive wheel via a counter shaft and a differential gear (not shown).

[Operation of Each Shift Speed in the Automatic Transmission]

Figure 3:
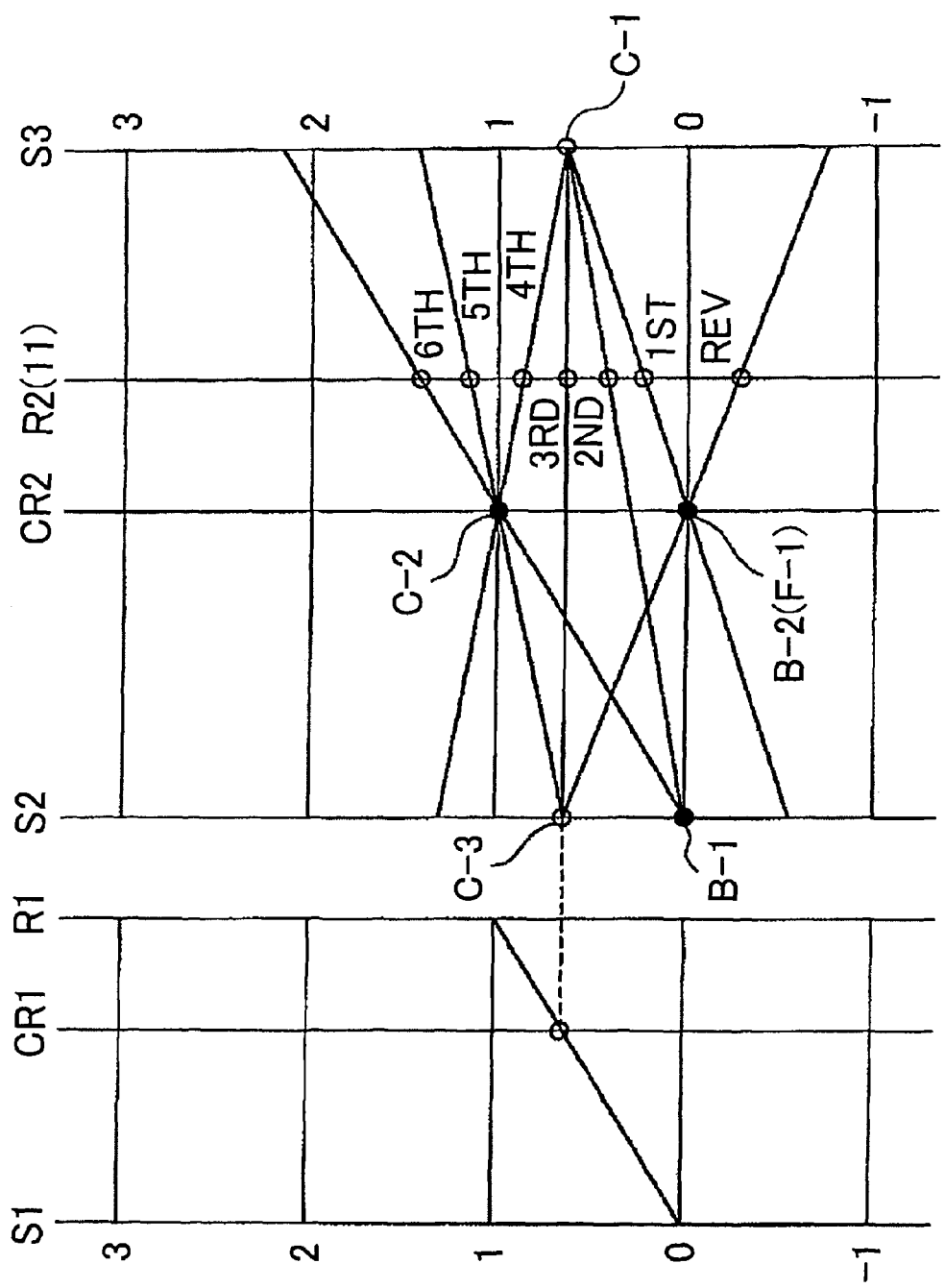
FIG. 3 is a speed diagram of the automatic speed change mechanism according to the embodiment of the present invention.

Based on the foregoing arrangements, operations of the automatic speed change mechanism 5 will be described with reference to FIGS. 1, 2, and 3. Note that, in a speed diagram shown in FIG. 3, an ordinate direction represents the speed of each rotating element (each gear) and an abscissa direction corresponds to the gear ratio of each rotating element. Further, as for the planetary gear SP of the speed diagram, the ordinate corresponds to the sun gear S1, the carrier CR1, and the ring gear R1 in that order from the leftward end in FIG. 3. As for the planetary gear unit PU of the speed diagram, the ordinate corresponds to the sun gear S3, the ring gear R2, the carrier CR2, and the sun gear S2 in that order from the rightward end in FIG. 3.

For example, in a forward first speed (1ST) in a D (drive) range, the clutch C-1 and the one-way clutch F-1 are engaged as shown in FIG. 2. Then, referring to FIGS. 1 and 3, the rotation of the carrier CR1 rotated at a reduced speed by the fixed sun gear S1 and the input rotation of the ring gear R1 is input to the sun gear S3 through the clutch C-1. In addition, the rotation of the carrier CR2 is restricted to that in one direction only (a forward rotating direction); specifically, the carrier CR2 is fixed by being prevented from rotating in a backward direction. The reduced speed rotation input to the sun gear S3 is then output to the ring gear R2 via the fixed carrier CR2, so that the counter gear 11 outputs a forward rotation as the forward first speed.

Note that, during engine braking (coasting), the brake B-2 is locked to fix the carrier CR2 so as to prevent the carrier CR2 from rotating forward, thereby maintaining a condition of the forward first speed. Further, in the forward first speed, the one-way clutch F-1 prevents the carrier CR2 from rotating backward, while permitting forward rotation. The forward first speed can therefore be achieved even more smoothly through an automatic engagement of the one-way clutch F-1 when, for example, a non-running range is changed to a running range.

In a forward second speed (2ND), referring to FIG. 2, the clutch C-1 is engaged and the brake B-1 is locked. Then, referring to FIGS. 1 and 3, the rotation of the carrier CR1 rotated at a reduced speed by the fixed sun gear S1 and the input rotation of the ring gear R1 is input to the sun gear S3 through the clutch C-1. The rotation of the sun gear S2 is fixed by the locking of the brake B-1. Then, the carrier CR2 rotates at a reduced speed lower than the sun gear S3, so that the reduced speed rotation input to the sun gear S3 is output to the ring gear R2 via the carrier CR2 and the counter gear 11 outputs a forward rotation as the forward second speed.

In a forward third speed (3RD), referring to FIG. 2, the clutch C-1 and the clutch C-3 are engaged. Then, referring to FIGS. 1 and 3, the rotation of the carrier CR1 rotated at a reduced speed by the fixed sun gear S1 and the input rotation of the ring gear R1 is input to the sun gear S3 through the clutch C-1. Further, the engagement of the clutch C-3 causes the reduced speed rotation of the carrier CR1 to be input to the sun gear S2. Specifically, the reduced speed rotation of the carrier CR1 is input to the sun gear S2 and the sun gear S3. As a result, the planetary gear unit PU is set into a condition of direct coupling of the reduced speed rotation, so that the reduced speed rotation is directly output to the ring gear R2 and the counter gear 11 outputs a forward rotation as the forward third speed.

In a forward fourth speed (4TH), referring to FIG. 2, the clutch C-1 and the clutch C-2 are engaged. Then, referring to FIGS. 1 and 3, the rotation of the carrier CR1 rotated at a reduced speed by the fixed sun gear S1 and the input rotation of the ring gear R1 is input to the sun gear S3 through the clutch C-1. Further, the engagement of the clutch C-2 causes the input rotation to be input to the carrier CR2. Then, the reduced speed rotation input to the sun gear S3 and the input rotation input to the carrier CR2 causes a reduced speed rotation higher than the forward third speed to be output to the ring gear R2, so that the counter gear 11 outputs a forward rotation as the forward fourth speed.

In a forward fifth speed (5TH), referring to FIG. 2, the clutch C-2 and the clutch C-3 are engaged. Then, referring to FIGS. 1 and 3, the rotation of the carrier CR1 rotated at a reduced speed by the fixed sun gear S1 and the input rotation of the ring gear R1 is input to the sun gear S2 through the clutch C-3. Further, the engagement of the clutch C-2 causes the input rotation to be input to the carrier CR2. Then, the reduced speed rotation input to the sun gear S2 and the input rotation input to the carrier CR2 causes an accelerated speed rotation slightly higher than the input rotation to be output to the ring gear R2, so that the counter gear 11 outputs a forward rotation as the forward fifth speed.

In a forward sixth speed (6TH), referring to FIG. 2, the clutch C-2 is engaged and the brake B-1 is locked. Then, referring to FIGS. 1 and 3, the engagement of the clutch C-2 causes the input rotation to be input to the carrier CR2. The rotation of the sun gear S2 is fixed by the locking of the brake B-1. Then, the fixed sun gear S2 causes the input rotation of the carrier CR2 to be output to the ring gear R2 as an accelerated speed rotation higher than the forward fifth speed, so that the counter gear 11 outputs a forward rotation as the forward sixth speed.

In a reverse first speed (REV), referring to FIG. 2, the clutch C-3 is engaged and the brake B-2 is locked. Then, referring to FIGS. 1 and 3, the rotation of the carrier CR1 rotated at a reduced speed by the fixed sun gear S1 and the input rotation of the ring gear R1 is input to the sun gear S2 through the clutch C-3. The rotation of the carrier CR2 is fixed by the locking of the brake B-2. Then, the reduced speed rotation input to the sun gear S2 is output to the ring gear R2 via the fixed carrier CR2 and the counter gear 11 outputs a reverse rotation as the reverse first speed.

It is to be noted that, in a P (parking) range and an N (neutral) range for example, the clutches C-1, C-2, and C-3 are released. This disconnects the carrier CR1 from the sun gear S2 and the sun gear S3; specifically, the planetary gear SP is disconnected from the planetary gear unit PU and the input shaft 10 is disconnected from the carrier CR2. As a result, power transmission between the input shaft 10 and the planetary gear unit PU is disconnected; specifically, the power transmission between the input shaft 10 and the counter gear 11 is disconnected.

[General Arrangements of the Hydraulic Control Apparatus]

A hydraulic control apparatus 1 of the automatic transmission 3 according to the embodiment of the present invention will be described below. Sections of generating pressures such as a line pressure, a secondary pressure, and a modulator pressure which are not shown in drawings showing the hydraulic control apparatus 1 will be first broadly described. Note that the sections of generating the line pressure, the secondary pressure, and the modulator pressure are the same as those found in common hydraulic control apparatuses for automatic transmissions and well known, and will therefore be only briefly described.

The hydraulic control apparatus 1 includes, for example, an oil pump, a primary regulator valve, a secondary regulator valve, a solenoid modulator valve, and a linear solenoid valve SLT which are not shown. When, for example, the engine is started, the oil pump rotatably drivably connected to the pump impeller 4a of the torque converter 4 is driven by being operatively connected to rotation of the engine. This generates a hydraulic pressure as oil is pumped up from an oil pan (not shown) via a strainer (not shown).

The hydraulic pressure generated by the oil pump is regulated to a line pressure $P_L$, while being adjusted to be discharged by the primary regulator valve based on a signal pressure $P_{SLT}$ of the linear solenoid valve SLT regulated and output according to a throttle opening. The line pressure $P_L$ is supplied, for example, to the solenoid modulator valve, a manual shift valve (a range pressure generating unit) 81 (see FIG. 5) to be described in detail later, and a linear solenoid valve SLC3 to be described in detail later. Of these, the line pressure $P_L$ supplied to the solenoid modulator valve is regulated to a modulator pressure $P_{MOD}$ that becomes a substantially predetermined pressure, by the valve. The modulator pressure $P_{MOD}$ is supplied as a source pressure for, for example, the linear solenoid valve SLT, and solenoid valves S1, S2 to be described in detail later.

The pressure discharged from the primary regulator valve is regulated to a secondary pressure $P_{SEC}$, while being further adjusted to be discharged by, for example, the secondary regulator valve. The secondary pressure $P_{SEC}$ is supplied to, for example, a lubricating oil path or an oil cooler. The secondary pressure $P_{SEC}$ is also supplied to the torque converter 4 and used for controlling the lock-up clutch 7.

Figure 5:
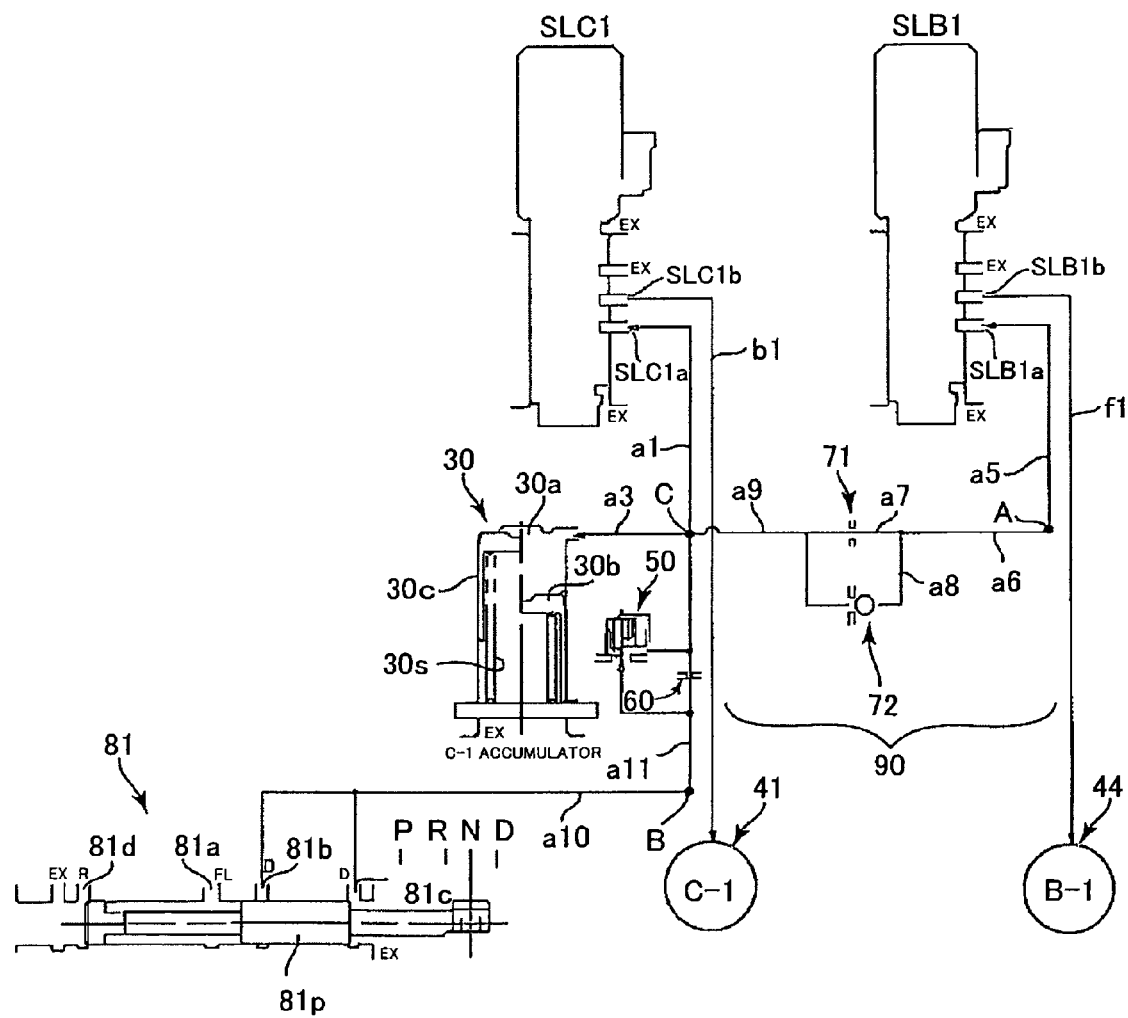
FIG. 5 is an explanatory view showing a principal part of the hydraulic control apparatus of the automatic transmission according to the embodiment of the present invention.

Referring to FIG. 5, the manual shift valve 81 is structured to include an input port 81a, a forward range pressure output port 81b, a forward range pressure drain port 81c, a reverse range pressure output port 81d, and a drain port EX, in addition to a spool 81p driven mechanically (or electrically) by a shift lever disposed at a driver's seat (not shown). An output state or a non-output state (drain) of the line pressure $P_L$ input to the input port 81a is set when the position of the spool 81p selected according to the shift range (for example, P, R, N, or D) is changed by the shift lever.

More specifically, when the D range is selected through the operation of the shift lever, the input port 81a to which the line pressure $P_L$ is input based on the position of the spool 81p and the forward range pressure output port 81b are brought into communication with each other, so that the line pressure $P_L$ is output from the forward range pressure output port 81b as a forward range pressure (D range pressure) $P_D$. When the R (reverse) range is selected through the operation of the shift lever, the input port 81a and the reverse range pressure output port 81d are brought into communication with each other based on the position of the spool 81p, so that the line pressure $P_L$ is output from the reverse range pressure output port 81d as a reverse range pressure (R range pressure) $P_{REV}$. In addition, the forward range pressure drain port 81c and the drain port EX are brought into communication with each other, so that the D range pressure $P_D$ is drained. When the P range or the N range is selected through the operation of the shift lever, the input port 81a is shut off from the forward range pressure output port 81b and the reverse range pressure output port 81d by the spool 81p, while the forward range pressure drain port 81c and the reverse range pressure output port 81d are brought into communication with the drain port EX; specifically, the D range pressure $P_D$ and the R range pressure $P_{REV}$ are drained (discharged) to be in the non-output state.

[Detailed Arrangements of the Shift Control Section of the Hydraulic Control Apparatus]

A section mainly performing the shift control in the hydraulic control apparatus 1 according to the embodiment of the present invention will be described below with reference to FIG. 4. Note that, to describe the spool position in the embodiment of the present invention, the position of the right-hand half of FIG. 4 will be referred to as the "right-hand-half position" and that of the left-hand half of FIG. 4 will be referred to as the "left-hand-half position".

The hydraulic control apparatus 1 includes four linear solenoid valves SLC1, SLC2, SLC3, and SLB1 for supplying an output pressure regulated as an engagement pressure directly to each of a total of five hydraulic servos. The five hydraulic servos are a hydraulic servo 41 of the clutch C-1, a hydraulic servo 42 of the clutch C-2, a hydraulic servo 43 of the clutch C-3, a hydraulic servo 44 of the brake B-1, and a hydraulic servo 45 of the brake B-2. The hydraulic control apparatus 1 further includes, for example, a solenoid valve S1, a solenoid valve S2, a first clutch apply relay valve 21, a second clutch apply relay valve 22, a C-2 relay valve 23, and a B-2 relay valve 24 as a portion for achieving a limp-home function and selecting the hydraulic servo 42 of the clutch C-2 or the hydraulic servo 45 of the brake B-2 for the output pressure of the linear solenoid valve SLC2.

Figure 4:
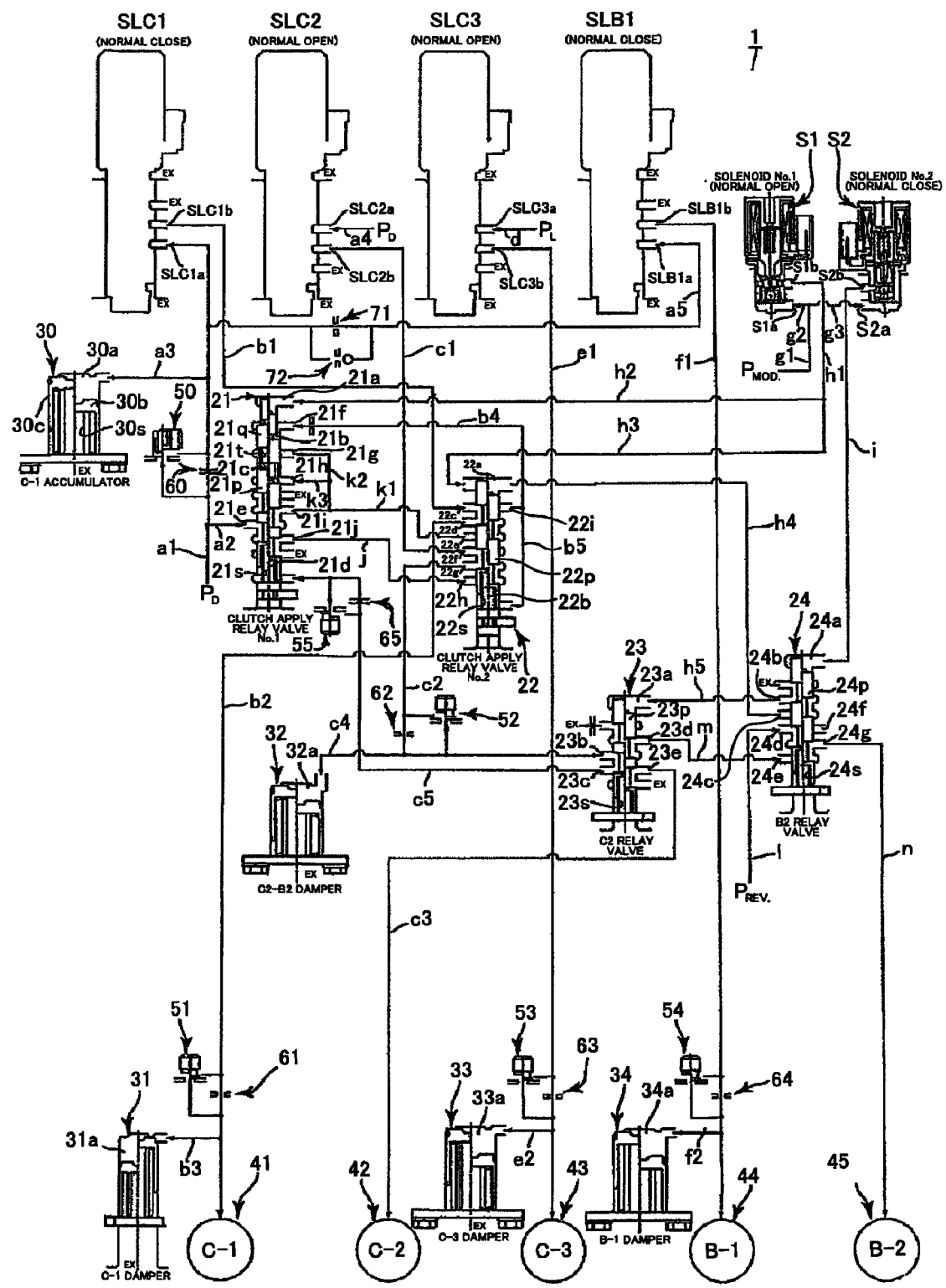
FIG. 4 is a circuit diagram showing a hydraulic control apparatus of the automatic transmission according to the embodiment of the present invention.

The forward range pressure output port 81b (and the forward range pressure drain port 81c) of the manual shift valve 81 (see FIG. 5) are connected to an oil path a1, an oil path a4, and an oil path a5 shown in FIG. 4 so that the forward range pressure $P_D$ can be input thereto. The reverse range pressure output port 81d of the manual shift valve 81 is connected to an oil path 1 so that the reverse range pressure $P_{REV}$ is to be input thereto. Further, the line pressure $P_L$ from the primary regulator valve (not shown) is input to an oil path d and the modulator pressure $P_{MOD}$ from the modulator valve (not shown) is input to an oil path g1.

Of these, the oil path a1 is connected to an input port 21e of the first clutch apply relay valve 21 to be described in detail later via an oil path a2. Further, a check valve 50 and an orifice (a second orifice) 60 are disposed on the oil path a1. In addition, the oil path a1 is connected to an accumulator 30 via an oil path a3 and to the linear solenoid valve (a first pressure regulating portion) SLC1. The accumulator 30 is structured to include a case 30c, a piston 30b, a spring 30s, and an oil chamber 30a. Specifically, the piston 30b is disposed inside the case 30c. The spring 30s urges the piston 30b. The oil chamber 30a is formed between the case 30c and the piston 30b.

Referring further to FIG. 5, the oil path a1 is connected to the manual shift valve 81 via oil paths a10, a11. The oil path a5 is connected to the manual shift valve 81 via the oil paths a10, a11 and a discharge delay zone 90 to be described in detail later. An orifice (delay mechanism, a first orifice) 71 and a check ball (delay mechanism, a one-way valve) 72 are disposed on the discharge delay zone 90.

Referring to FIG. 4, on the other hand, the linear solenoid valve SLC1 is a normally closed type that is in the non-output state when deenergized. The linear solenoid valve SLC1 has an input port SLC1a and an output port SLC1b. The input port SLC1a inputs the forward range pressure $P_D$ via the oil path a1 and the output port SLC1b outputs a control pressure $P_{SLC1}$ to the hydraulic servo 41 as an engagement pressure $P_{C1}$ by regulating the forward range pressure $P_D$. Specifically, the linear solenoid valve SLC1 is structured to be in the non-output state by shutting off the input port SLC1a and the output port SLC1b when deenergized and, when energized based on a command value from a control unit (ECU) (not shown), to increase an amount of communication (opening amount) between the input port SLC1a and the output port SLC1b according to the command value, specifically, to output the engagement pressure $P_{C1}$ in accordance with the command value. Additionally, the output port SLC1b of the linear solenoid valve SLC1 is connected to an input port 22c of the second clutch apply relay valve 22 to be described later via an oil path b1.

The linear solenoid valve SLC2 is a normally open type that is in the output state when deenergized. The linear solenoid valve SLC2 has an input port SLC2a and an output port SLC2b. The input port SLC2a inputs the forward range pressure $P_D$ via, for example, the oil path a4 and the output port SLC2b outputs a control pressure $P_{SLC2}$ to the hydraulic servo 42 as an engagement pressure $P_{C2}$ (or an engagement pressure $P_{B2}$) by regulating the forward range pressure $P_D$. Specifically, the linear solenoid valve SLC2 is structured to be in the output state in which the input port SLC2a and the output port SLC2b are in communication with each other when deenergized and, when energized based on a command value from the control unit (ECU) (not shown), to decrease the amount of communication (specifically, throttle down the opening amount) between the input port SLC2a and the output port SLC2b according to the command value, specifically, to output the engagement pressure $P_{C2}$ (or $P_{B2}$) in accordance with the command value. Additionally, the output port SLC2b of the linear solenoid valve SLC2 is connected to an input port 2f of the second clutch apply relay valve 22 to be described later via an oil path c1.

The linear solenoid valve SLC3 is a normally open type that is in the output state when deenergized. The linear solenoid valve SLC2 has an input port SLC3a and an output port SLC3b. The input port SLC3a inputs the line pressure $P_L$ via, for example, the oil path d and the output port SLC3b outputs a control pressure $P_{SLC3}$ to the hydraulic servo 43 as an engagement pressure $P_{C3}$ by regulating the line pressure $P_L$. Specifically, the linear solenoid valve SLC3 is structured to be in the output state in which the input port SLC3a and the output port SLC3b are in communication with each other when deenergized and, when energized based on a command value from the control unit (ECU) (not shown), to decrease the amount of communication (specifically, reduce the opening amount) between the input port SLC3a and the output port SLC3b according to the command value, specifically, to output the engagement pressure $P_{C3}$ in accordance with the command value. Additionally, the output port SLC3b of the linear solenoid valve SLC3 is connected to the hydraulic servo 43 of the clutch C-3 via an oil path e1. A check valve 53 and an orifice 63 are disposed on the oil path e1. Further, an oil chamber 33a of a C-3 damper 33 is connected to the oil path e1 via an oil path e2. Note that the C-3 damper 33 is similar in structure to the accumulator 30. The C-3 damper 33 is a commonly found damper and a detailed description thereof will be omitted.

The linear solenoid valve (a second pressure regulating portion) SLB1 is a normally closed type that is in the non-output state when deenergized. The linear solenoid valve SLB1 has an input port SLB1a and an output port SLB1b. The input port SLB1a inputs the forward range pressure $P_D$ via, for example, the oil path a5 and the output port SLB1b outputs a control pressure $P_{SLB1}$ to the hydraulic servo 44 as an engagement pressure $P_{B1}$ by regulating the forward range pressure $P_D$. Specifically, the linear solenoid valve SLB1 is structured to be in the non-output state by shutting off the input port SLB1a and the output port SLB1b when deenergized and, when energized based on a command value from the control unit (ECU) (not shown), to increase the amount of communication (opening amount) between the input port SLB1a and the output port SLB1b according to the command value, specifically, to output the engagement pressure $P_{B1}$ in accordance with the command value. Additionally, the output port SLB1b of the linear solenoid valve SLB1 is connected to the hydraulic servo 44 of the brake B-1 via an oil path f1. A check valve 54 and an orifice 64 are disposed on the oil path f1. Further, an oil chamber 34a of a B-1 damper 34 is connected to the oil path f1 via an oil path f2.

The solenoid valve S1 is a normally open type that is in the output state when deenergized. The solenoid valve S1 has an input port S1a and an output port S1b. The input port S1a inputs the modulator pressure $P_{MOD}$ via the oil path g1 and an oil path g2. The output port S1b outputs the modulator pressure $P_{MOD}$ substantially directly as a signal pressure $P_{S1}$ when deenergized (specifically, when turned OFF). The output port S1b is connected to an oil chamber 21a of the first clutch apply relay valve 21 via oil paths h1, h2, to an oil chamber 22a of the second clutch apply relay valve 22 via oil paths h1, h3, and to an input port 24c of the B-2 relay valve 24 via an oil path h4.

The solenoid valve S2 is a normally closed type that is in the non-output state when deenergized. The solenoid valve S2 has an input port S2a and an output port S2b. The input port S2a inputs the modulator pressure $P_{MOD}$ via the oil path g1 and an oil path g3. The output port S2b outputs the modulator pressure $P_{MOD}$ substantially directly as a signal pressure $P_{S2}$ when energized (specifically, when turned ON). The output port S2b is connected to an oil chamber 24a of the B-2 relay valve 24 via an oil path i.

The first clutch apply relay valve 21 is structured to include two spools 21p, 21q, a spring 21s urging the spool 21p upward in FIG. 4, and a spring 21t urging the spools 21p, 21q in a direction of spacing apart. The first clutch apply relay valve 21 is structured to include also the oil chamber 21a disposed upward of the spool 21q in FIG. 4 and oil chambers 21b, 21c, 21d. The oil chamber 21d is disposed downward of the spool 21p in FIG. 4. The oil chamber 21c is disposed between the spools 21p, 21q. The oil chamber 21b is formed by a difference in diameter of land portions of the spool 21q (difference in pressure receiving area). The first clutch apply relay valve 21 is structured to include further the input port 21e, an input port 21f, an input port 21g, an input port 21h, an output port 21i, an output port 21j, and a drain port EX.

The first clutch apply relay valve 21 is structured such that the input port 21e and the output port 21j are brought into communication with each other and the input port 21e and the output port 21i are shut off from each other when the spools 21p, 21q are in the left-hand-half position; and that the input port 21e and the output port 21i are brought into communication with each other and the output port 21j and the drain port EX are brought into communication with each other when the spools 21p, 21q are in the right-hand-half position. The first clutch apply relay valve 21 is further structured such that the input port 21h is shut off when the spool 21p is in the left-hand-half position and that the input port 21g is shut off when the spool 21q is in the right-hand-half position.

As described above, the oil chamber 21a is connected to the output port S1b of the solenoid valve S1 via the oil paths h1, h2 and the oil chamber 21b is connected to an output port 22i of the second clutch apply relay valve 22 to be described later via an oil path b4 from the input port 21f. The forward range pressure $P_D$ is input to the input port 21e via the oil paths a1, a2. The output port 21j that is brought into communication with the input port 21e when the spool 21p is in the left-hand-half position is connected to an input port 22h of the second clutch apply relay valve 22 via an oil path j. In addition, the output port 21i that is brought into communication with the input port 21e when the spool 21p is in the right-hand-half position is connected to the input port 21g via oil paths k1, k2 and to the input port 21h via the oil paths k1, k2, and an oil path k3, respectively. Specifically, the output port 21i is connected to the oil chamber 21c regardless of the position of the spools 21p, 21q. Further, the output port 21i is connected to an input port 22e of the second clutch apply relay valve 22 to be described later via the oil path k1. In addition, an output port 23c of the C-2 relay valve 23 is connected to the oil chamber 21d via an oil path c5. A check valve 55 and an orifice 65 are disposed on the oil path c5.

The second clutch apply relay valve 22 is structured to include a spool 22p and a spring 22s urging the spool 22p upward in FIG. 4. The second clutch apply relay valve 22 is structured to include also the oil chamber 22a disposed upward of the spool 22p in FIG. 4 and an oil chamber 22b disposed downward of the spool 22p in FIG. 4. The second clutch apply relay valve 22 is structured to include further the input port 22c, an output port 22d, the input port 22e, the input port 22f, an output port 22g, the input port 22h, and the output port 22i.

The second clutch apply relay valve 22 is structured such that the input port 22c and the output port 22d, and the output port 22i, are brought into communication with each other; the input port 22f and the output port 22g are brought into communication with each other; and the input port 22e and the input port 22h are shut off from each other when the spool 22p is in the left-hand-half position. Further, the second clutch apply relay valve 22 is structured such that the input port 22e and the output port 22d are brought into communication with each other; the input port 22h and the output port 22g are brought into communication with each other; and the input port 22c, the output port 22i, and the input port 22f are shut off from each other when the spool 22p is in the right-hand-half position.

As described above, the oil chamber 22a is connected to the output port S1b of the solenoid valve S1 via the oil paths h1, h3 and to the input port 24c of the B-2 relay valve 24 to be described later via the oil path h4. The input port 22c is connected to the output port SLC1b of the linear solenoid valve SLC1 via the oil path b1. The output port 22d that is brought into communication with the input port 22c when the spool 22p is in the left-hand-half position is connected to the hydraulic servo 41 of the clutch C-1 via an oil path b2. A check valve 51 and an orifice 61 are disposed on the oil path b2. An oil chamber 31a of a C-1 damper 31 is connected to the oil path b2 via an oil path b3. Similarly, the output port 22i that is brought into communication with the input port 22c when the spool 22p is in the left-hand-half position is connected to the input port 21f of the first clutch apply relay valve 21 via the oil path b4 and to the oil chamber 22b via the oil path b4 and an oil path b5. The input port 22f, on the other hand, is connected to the output port SLC2b of the linear solenoid valve SLC2 via the oil path c1. The input port 22h is connected to the output port 21j of the first clutch apply relay valve 21 via the oil path j. The output port 22g that is brought into communication with the input port 22f when the spool 22p is in the left-hand-half position and with the input port 22h when the spool 22p is in the right-hand-half position is connected to an input port 23b of the C-2 relay valve 23 to be described later via an oil path c2. A check valve 52 and an orifice 62 are disposed on the oil path c2 and an oil chamber 32a of a C2-B2 damper 32 is connected to the oil path c2 via an oil path c4.

The C-2 relay valve 23 is structured to include a spool 23p and a spring 23s urging the spool 23p upward in FIG. 4. The C-2 relay valve 23 is structured to include also an oil chamber 23a disposed upward of the spool 23p in FIG. 4. The C-2 relay valve 23 is structured to include further the input port 23b, the output port 23c, an output port 23d, an output port 23e, and a drain port EX.

The C-2 relay valve 23 is structured such that the input port 23b and the output port 23c, and the output port 23e, are brought into communication with each other and the output port 23d and the drain port EX are brought into communication with each other when the spool 23p is in the left-hand-half position. Further, the C-2 relay valve 23 is structured such that the input port 23b and the output port 23d are brought into communication with each other and the output port 23c and the output port 23e, and the drain port EX, are brought into communication with each other when the spool 23p is in the right-hand-half position.

The oil chamber 23a is connected to an output port 24b of the B-2 relay valve 24 to be described later via an oil path h5. The input port 23b is connected to the output port 22g of the second clutch apply relay valve 22 via the oil path c2 and the output port 23e that is brought into communication with the input port 23b when the spool 23p is in the left-hand-half position is connected to the hydraulic servo 42 of the clutch C-2 via an oil path c3. Similarly, the output port 23c that is brought into communication with the input port 23b when the spool 23p is in the left-hand-half position is connected to the oil chamber 21d of the first clutch apply relay valve 21 via the oil path c5. The check valve 55 and the orifice 65 are disposed on the oil path c5. Additionally, the output port 23d that is brought into communication with the input port 23b when the spool 23p is in the right-hand-half position is connected to an input port 24e of the B-2 relay valve 24 via an oil path m.

The B-2 relay valve 24 is structured to include a spool 24p and a spring 24s urging the spool 24p upward in FIG. 4. The B-2 relay valve 24 is structured to include also the oil chamber 24a disposed upward of the spool 24p in FIG. 4. The B-2 relay valve 24 is structured to include further the output port 24b, the input port 24c, an input port 24d, the input port 24e, an output port 24f, an output port 24g, and a drain port EX.

The B-2 relay valve 24 is structured such that the input port 24d and the output port 24f, and the output port 24g, are brought into communication with each other, the output port 24b and the drain port EX are brought into communication with each other, and the input port 24c is shut off when the spool 24p is in the left-hand-half position. Further, the B-2 relay valve 24 is structured such that the input port 24c and the output port 24b are brought into communication with each other, the input port 24e and the output port 24g are brought into communication with each other, and the input port 24d and the drain port EX are shut off, when the spool 24p is in the right-hand-half position.

The oil chamber 24a is connected to the output port S2b of the solenoid valve S2 via the oil path i. The input port 24d is connected to the reverse range pressure output port 81d of the manual shift valve 81 (see FIG. 5) to which the reverse range pressure $P_{REV}$ is output via the oil path 1. The input port 24e is connected to the output port 23d of the C-2 relay valve 23 via the oil path m. The output port 24g that is brought into communication with the input port 24d when the spool 24p is in the left-hand-half position and with the input port 24e when the spool 24p is in the right-hand-half position is connected to the hydraulic servo 45 of the brake B-2 via an oil path n. Specifically, the hydraulic servo 45 of the brake B-2 is connected to the reverse range pressure output port 81d of the manual shift valve 81 or the output port SLC2b of the linear solenoid valve SLC2. In addition, as described above, the input port 24c is connected to the output port S1b of the solenoid valve S1 via the oil path h4, the oil chamber 22a of the second clutch apply relay valve 22, and the oil paths h1, h3, and the output port 24b that is brought into communication with the input port 24c when the spool 24p is in the right-hand-half position is connected to the oil chamber 23a of the C-2 relay valve 23 via the oil path h5. Note that the output port 24f that is brought into communication with the input port 24d when the spool 24p is in the left-hand-half position is connected to an oil chamber of the primary regulator valve via an oil path (not shown), so that the reverse range pressure $P_{REV}$ may act on the primary regulator valve to increase the line pressure $P_L$ during reversing.

[Operations of the Hydraulic Control Apparatus]

Operations of the hydraulic control apparatus 1 according to the embodiment of the present invention will be described below.

Referring to FIG. 4, when, for example, the driver turns ON the ignition, hydraulic control by the hydraulic control apparatus 1 is started. If, for example, the shift lever is selected in the P range or the N range, the normally open type linear solenoid valve SLC2, linear solenoid valve SLC3, and solenoid valve S1 are energized through an electric command of the control unit (not shown) and the respective input ports and output ports are shut off. When, for example, the engine is next started, a hydraulic pressure is generated through rotation of the oil pump (not shown) based on rotation of the engine. The hydraulic pressure is regulated, respectively, to the line pressure $P_L$ and the modulator pressure $P_{MOD}$ by the primary regulator valve and the solenoid modulator valve and output as described heretofore. The line pressure $P_L$ is then input to the input port 81a of the manual shift valve 81 (see FIG. 5) and to the input port SLC3a of the linear solenoid valve SLC3 via the oil path d, while the modulator pressure $P_{MOD}$ is input to the input ports S1a, S2a of the solenoid valves S1, S2, respectively, via the oil paths g1, g2, g3.

[Operation in Shift from N to D Range (Forward First Speed)]

Next, assume, for example, that the driver places the shift lever in the D range position from the N range position. Then, the forward range pressure $P_D$ is output from the forward range pressure output port 81b of the manual shift valve 81 (see FIG. 5) to the oil paths a1, a4, a5. The forward range pressure $P_D$ is then input to the linear solenoid valve SLC1 via the oil path a1, to the linear solenoid valve SLC2 via the oil path a4, to the linear solenoid valve SLB1 via the oil path a5, and the first clutch apply relay valve 21 via the oil paths a1, a2.

The check valve 50 and the orifice 60 are disposed on the oil path a1. The forward range pressure $P_D$ causes the check valve 50 to open, so that supply of the forward range pressure $P_D$ for the linear solenoid valve SLC1 is at a more rapid pace as compared with timing during discharge. In addition, the forward range pressure $P_D$ supplied to the oil path a1 is input to the oil chamber 30a of the accumulator 30 via the oil path a3. Then, the accumulator 30 stores therein the forward range pressure $P_D$ to be supplied to the linear solenoid valve SLC1 and the linear solenoid valve SLB1.

The first clutch apply relay valve 21 having the input port 21e to which the forward range pressure $P_D$ is input from the oil path a2 is in the left-hand-half position because of an urging force of the spring 21s in the beginnings of the D range selected (beginnings of the shift from N to D) for lack of the signal pressure $P_{S1}$ as a result of the solenoid valve S1 being energized, so that the forward range pressure $P_D$ is output to the oil path j from the output port 21j. Similarly, for lack of the signal pressure $P_{S1}$ as a result of the solenoid valve S1 being energized, the input port 22h is shut off in the second clutch apply relay valve 22 which is in the left-hand-half position by the urging force of the spring 22s.

When, for example, the control unit next determines the forward first speed, the linear solenoid valve SLC1 is energized through the electric control by the control unit. The forward range pressure $P_D$ being input to the input port SLC1a is regulated and controlled, and output from the output port SLC1b such that the control pressure $P_{SLC1}$ gradually increases as the engagement pressure $P_{C1}$. The control pressure $P_{SLC1}$ (engagement pressure $P_{C1}$) is thereby input to the input port 22c of the second clutch apply relay valve 22 via the oil path b1.

The second clutch apply relay valve 22 which is in the left-hand-half position then outputs the control pressure $P_{SLC1}$ input to the input port 22c from the output port 22i, and also from the output port 22d. The control pressure $P_{SLC1}$ output from the output port 22i is input to the oil chamber 22b via the oil paths b4, b5 to lock the second clutch apply relay valve 22 in the left-hand-half position. The control pressure $P_{SLC1}$ is also input to the oil chamber 21b of the first clutch apply relay valve 21 via the oil path b4, thereby counteracting the urging force of the spring 21s to press the spools 21p, 21q downwardly in FIG. 4. The first clutch apply relay valve 21 is thereby repositioned in the right-hand-half position.

The first clutch apply relay valve 21 with the spools 21p, 21q repositioned in the right-hand-half position uses the control pressure $P_{SLC1}$ output from the output port 22i of the second clutch apply relay valve 22 to counteract the urging force of the spring 21t, thereby pressing the spool 21q downwardly in FIG. 4. The forward range pressure $P_D$ input from the input port 21e is, however, output from the output port 21i and input to the oil chamber 21c via the oil paths k1, k2, k3 and the input port 21h. The spool 21q is therefore repositioned upwardly in FIG. 4 by the hydraulic pressure acting on the oil chamber 21c and the urging force of the spring 21t; specifically, the spools 21p, 21q are locked in positions spaced apart from each other. Note that the forward range pressure $P_D$ input from the oil path k1 to the input port 22e of the second clutch apply relay valve 22 is shut off at the input port 22e.

The control pressure $P_{SLC1}$ input from the linear solenoid valve SLC1 to the input port 22c of the second clutch apply relay valve 22 as described above is output from the output port 22d to the hydraulic servo 41 via the oil path b2 as the engagement pressure $P_{C1}$, so that the clutch C-1 is engaged. This achieves the forward first speed, coupled with the locking of the one-way clutch F-1.

In addition, the check valve 51 and the orifice 61 are disposed on the oil path b2. When the engagement pressure $P_{C1}$ (control pressure $P_{SLC1}$) is to be supplied to the hydraulic servo 41, the check valve 51 is closed and the hydraulic pressure is supplied at a mild pace only via the orifice 61. When the engagement pressure $P_{C1}$ is to be discharged from the hydraulic servo 41, the check valve 51 is opened to let the engagement pressure $P_{C1}$ be discharged at a rapid pace as compared with the case of the supply. In addition, the engagement pressure $P_{C1}$ supplied to the oil path b2 is input to the oil chamber 31a of the C-1 damper 31 via the oil path b3 and the C-1 damper 31 prevents pulsation of the engagement pressure $P_{C1}$ supplied to, and discharged from, the hydraulic servo 41 and absorbs a surge pressure (a sharply fluctuating pressure), for example.

[Operation in Engine Braking of the Forward First Speed]

When, for example, the control unit determines engine braking of the forward first speed, the solenoid valve S2 is energized, the solenoid valve S1 is deenergized, and the linear solenoid valve SLC2 is controlled for pressure regulation through the electric command from the control unit. When the solenoid valve S2 is energized, the modulator pressure $P_{MOD}$ input to the input port S2a via the oil paths g1, g3 is output from the output port S2b as the signal pressure $P_{S2}$ and input to the oil chamber 24a of the B-2 relay valve 24 via the oil path i. Then, the spool 24p is repositioned downwardly in the figure against the urging force of the spring 24s and the B-2 relay valve 24 is placed in the right-hand-half position.

When the solenoid valve S1 is deenergized, the modulator pressure $P_{MOD}$ input to the input port S1a via the oil paths g1, g2 is output from the output port S1b as the signal pressure $P_{S1}$. The signal pressure $P_{S1}$ is then input to the oil chamber 21a of the first clutch apply relay valve 21 via the oil paths h1, h2, to the oil chamber 22a of the second clutch apply relay valve 22 via the oil paths h1, h3, and to the input port 24c of the B-2 relay valve 24 via the oil path h4; and further to the oil chamber 23a of the C-2 relay valve 23 via the oil path h5 from the output port 24b of the B-2 relay valve 24 placed in the right-hand-half position.

Then, the C-2 relay valve 23 is placed in the right-hand-half position as the signal pressure $P_{S1}$ input to the oil chamber 23a causes the spool 23p to counteract the urging force of the spring 23s and be repositioned downwardly in FIG. 4. Note that the first clutch apply relay valve 21 is placed in the right-hand-half position as the signal pressure $P_{S1}$ being input to the oil chamber 21a causes the spool 21q to be repositioned downwardly in FIG. 4; however, the spool 21p is not particularly affected by remaining in the same right-hand-half position as in the forward first speed. In addition, with the second clutch apply relay valve 22, though the signal pressure $P_{S1}$ is input to the oil chamber 22a, the engagement pressure $P_{C1}$ of the oil chamber 22b and the urging force of the spring 22s overcome the signal pressure $P_{S1}$ to let the spool 22p remain locked in the left-hand-half position.

When the linear solenoid valve SLC2 is then controlled for pressure regulation and the control pressure $P_{SLC2}$ is output from the output port SLC2b, the control pressure $P_{SLC2}$ is input to the input port 22f of the second clutch apply relay valve 22 locked in the left-hand-half position via the oil path c1 and output as the engagement pressure $P_{B2}$ from the output port 22g to the oil path c2.

The engagement pressure $P_{B2}$ output to the oil path c2 is input to the input port 23b of the C-2 relay valve 23 placed in the right-hand-half position and output from the output port 23d. In addition, the engagement pressure $P_{B2}$ is input to the input port 24e of the B-2 relay valve 24 placed in the right-hand-half position via the oil path m, output from the output port 24g, and input to the hydraulic servo 45 via the oil path n, so that the brake B-2 is locked. This achieves the engine braking of the forward first speed, coupled with the engagement of the clutch C-1.

Note that the check valve 52 and the orifice 62 are disposed on the oil path c2. When the engagement pressure $P_{B2}$ is to be supplied to the hydraulic servo 45 of the brake B-2, the check valve 52 is closed and the hydraulic pressure is supplied at a mild pace only via the orifice 62. At the time of discharge to be described later, the check valve 52 is opened to let the hydraulic pressure in the oil path c2 be discharged at a rapid pace. In addition, the engagement pressure $P_{B2}$ supplied to the oil path c2 is input to the oil chamber 32a of the C2-B2 damper 32 via the oil path c4 and the C2-B2 damper 32 prevents pulsation of the engagement pressure $P_{B2}$ supplied to, and discharged from, the hydraulic servo 45, and absorbs a surge pressure (a sharply fluctuating pressure), for example.

When, for example, the control unit determines a forward drive of the forward first speed, specifically, cancellation of the engine braking, the solenoid valve S2 is deenergized and the solenoid valve S1 is energized, and in addition, the linear solenoid valve SLC2 is closed by being energized and the control pressure $P_{SLC2}$ as the engagement pressure $P_{B2}$ is zeroed and drained. Further, the engagement pressure $P_{B2}$ of the hydraulic servo 45 of the brake B-2 is discharged from the drain port EX of the manual shift valve 81 (see FIG. 5) via the input port 24d, the oil path 1, and the reverse range pressure output port 81d of the manual shift valve 81, since the B-2 relay valve 24 is repositioned in the left-hand-half position as a result of the deenergization of the solenoid valve S2. This achieves quick draining that is faster than that drained via the linear solenoid valve SLC2, so that the brake B-2 is released quickly. Note that the hydraulic pressure in the oil path m is discharged from the drain port EX of the C-2 relay valve 23 repositioned in the left-hand-half position and the hydraulic pressure in the oil paths c1, c2 is discharged from the drain port EX of the linear solenoid valve SLC2.

[Operation in the Forward Second Speed]

When, for example, the control unit determines the forward second speed from the condition of the forward first speed, the linear solenoid valve SLB1 is controlled for pressure regulation through the electric command from the control unit, while maintaining the pressure regulation condition for the linear solenoid valve SLC1 with the solenoid valve S1 energized and the solenoid valve S2 deenergized in the same manner as in the forward first speed (excepting during the engine braking).

Specifically, when the linear solenoid valve SLB1 is controlled for pressure regulation, the control pressure $P_{SLB1}$ is output as the engagement pressure $P_{B1}$ from the output port SLB1b and input to the hydraulic servo 44 via the oil path f1, so that the brake B-1 is locked. This achieves the forward second speed, coupled with the engagement of the clutch C-1.

In addition, the check valve 54 and the orifice 64 are disposed on the oil path f1. When the engagement pressure $P_{B1}$ is to be supplied to the hydraulic servo 44 of the brake B-1, the check valve 54 is closed and the hydraulic pressure is supplied at a mild pace only via the orifice 64. When the engagement pressure $P_{B1}$ is to be discharged from the hydraulic servo 44, the check valve 54 is opened to let the engagement pressure $P_{B1}$ be discharged at a rapid pace as compared with the case of the supply. In addition, the engagement pressure $P_{B1}$ supplied to the oil path f1 is input to the oil chamber 34a of the B-1 damper 34 via the oil path f2 and the B-1 damper 34 prevents pulsation of the engagement pressure $P_{B1}$ supplied to, and discharged from, the hydraulic servo 44, and absorbs a surge pressure (a sharply fluctuating pressure), for example.

[Operation in the Forward Third Speed]

When, for example, the control unit determines the forward third speed from the condition of the forward second speed, the linear solenoid valve SLB1 is closed by being deenergized and the linear solenoid valve SLC3 is controlled for pressure regulation through the electric command from the control unit, while maintaining the pressure regulation condition for the linear solenoid valve SLC1 with the solenoid valve S1 energized and the solenoid valve S2 deenergized in the same manner.

Specifically, a release control of the brake B-1 is first performed through the control of the linear solenoid valve SLB1 for pressure regulation; specifically, the engagement pressure $P_{B1}$ (control pressure $P_{SLB1}$) of the hydraulic servo 44 of the brake B-1 is controlled to be discharged from the drain port EX of the linear solenoid valve SLB1 via the oil path f1, so that the brake B-1 is released. Further, the other linear solenoid valve SLC3 is controlled for pressure regulation from the condition of being energized to be closed to make a control pressure $P_{SLC3}$ to be zero. The control pressure $P_{SLC3}$ is output as the engagement pressure $P_{C3}$ from the output port SLC3b and input to the hydraulic servo 43 via the oil path e1, so that the clutch C-3 is engaged. This achieves the forward third speed, coupled with the engagement of the clutch C-1.

In addition, the check valve 53 and the orifice 63 are disposed on the oil path e1. When the engagement pressure $P_{C3}$ is to be supplied to the hydraulic servo 43 of the clutch C-3, the check valve 53 is closed and the hydraulic pressure is supplied at a mild pace only via the orifice 63. When the engagement pressure $P_{C3}$ is to be discharged from the hydraulic servo 43, the check valve 53 is opened to let the hydraulic pressure be discharged at a rapid pace as compared with the case of the supply. In addition, the engagement pressure $P_{C3}$ supplied to the oil path e1 is input to the oil chamber 33a of the C-3 damper 33 via the oil path e2 and the C-3 damper 33 prevents pulsation of the engagement pressure $P_{C3}$ supplied to, and discharged from, the hydraulic servo 43, and absorbs a surge pressure (a sharply fluctuating pressure), for example.

[Operation in the Forward Fourth Speed]

When, for example, the control unit determines the forward fourth speed from the condition of the forward third speed, the linear solenoid valve SLC3 is closed by being deenergized and the linear solenoid valve SLC2 is controlled for pressure regulation through the electric command from the control unit, while maintaining the pressure regulation condition for the linear solenoid valve SLC1 with the solenoid valve S1 energized and the solenoid valve S2 deenergized in the same manner.

Specifically, a release control of the clutch C-3 is first performed through the control of the linear solenoid valve SLC3 for pressure regulation; specifically, the engagement pressure $P_{C3}$ (control pressure $P_{SLC3}$) of the hydraulic servo 43 of the clutch C-3 is controlled to be discharged from the drain port EX of the linear solenoid valve SLC3 via the oil path e1, so that the clutch C-3 is released. Further, the other linear solenoid valve SLC2 is controlled for pressure regulation from the condition of being energized to be closed to make a control pressure $P_{SLC2}$ to be zero. The control pressure $P_{SLC2}$ is output as the engagement pressure $P_{C2}$ from the output port SLC2b and input to the input port 22f of the second clutch apply relay valve 22 via the oil path c1.

As described above, the second clutch apply relay valve 22 is locked in the left-hand-half position because the solenoid valve S1 is energized, so that the signal pressure $P_{S1}$ is not being input to the oil chamber 22a, and because of the engagement pressure $P_{C1}$ input to the oil chamber 22b. The control pressure $P_{SLC2}$ input to the input port 22f is therefore output from the output port 22g as the engagement pressure $P_{C2}$. The engagement pressure $P_{C2}$ output from the output port 22g is input to the input port 23b of the C-2 relay valve 23 via the oil path c2.

In addition, because the solenoid valve S2 is deenergized to place the B-2 relay valve 24 in the left-hand-half position and the oil chamber 23a and the oil path h5 are drained, the C-2 relay valve 23 is placed in the left-hand-half position by the urging force of the spring 23s. The engagement pressure $P_{C2}$ input to the input port 23b is therefore output from the output port 23c and also from the output port 23e. The engagement pressure $P_{C2}$ output from the output port 23c is input to the oil chamber 21d of the first clutch apply relay valve 21 via the oil path c5. The engagement pressure $P_{C2}$, coupled with the urging force of the spring 21s, places to lock the spool 21p of the first clutch apply relay valve 21 in the left-hand-half position. At this time, the forward range pressure $P_D$ input to the input port 22e via the oil path k1 is output to the oil path j with the output port 21j being changed from the output port 21i, but is shut off by the input port 22h of the second clutch apply relay valve 22. Additionally, because the forward range pressure $P_D$ supplied to the oil path k1 is shut off, the supply of the forward range pressure $P_D$ as a lock pressure relative to the oil chamber 21c via the oil paths k2, k3 is canceled.

Note that the check valve 55 and the orifice 65 are disposed on the oil path c5. When the engagement pressure $P_{C2}$ is to be supplied to the oil chamber 21d of the first clutch apply relay valve 21, the check valve 55 is closed and the hydraulic pressure is supplied at a mild pace only via the orifice 65. When the engagement pressure $P_{C2}$ is to be discharged from the oil chamber 21d, the check valve 55 is opened to let the hydraulic pressure be discharged at a rapid pace as compared with the case of supply.

The engagement pressure $P_{C2}$ output from the output port 23e of the C-2 relay valve 23 is input to the hydraulic servo 42 via the oil path c3, so that the clutch C-2 is engaged. This achieves the forward fourth speed, coupled with the engagement of the clutch C-1.

Further, as described above, the check valve 52 and the orifice 62 are disposed on the oil path c2. In the same manner as in the engine braking of the forward first speed, when the engagement pressure $P_{C2}$ is to be supplied to the hydraulic servo 42 of the clutch C-2, the check valve 52 is closed and the hydraulic pressure is supplied at a mild pace only via the orifice 62. At the time of discharge of the engagement pressure $P_{C2}$ from the hydraulic servo 42, the check valve 52 is opened to let the hydraulic pressure be discharged at a rapid pace as compared with the case of the supply. In addition, the engagement pressure $P_{C2}$ supplied to the oil path c2 is input to the oil chamber 32a of the C2-B2 damper 32 via the oil path c4 and the C2-B2 damper 32 prevents pulsation of the engagement pressure $P_{C2}$ supplied to, and discharged from, the hydraulic servo 42, and absorbs a surge pressure (a sharply fluctuating pressure), for example.

[Operation in the Forward Fifth Speed]

When, for example, the control unit determines the forward fifth speed from the condition of the forward fourth speed, the linear solenoid valve SLC1 is closed by being deenergized and the linear solenoid valve SLC3 is controlled for pressure regulation through the electric command from the control unit, while maintaining the pressure regulation condition for the linear solenoid valve SLC2 with the solenoid valve S1 energized and the solenoid valve S2 deenergized in the same manner.

Specifically, a release control of the clutch C-1 is first performed through the control of the linear solenoid valve SLC1 for pressure regulation; specifically, the engagement pressure $P_{C1}$ (control pressure $P_{SLC1}$) of the hydraulic servo 41 of the clutch C-1 is controlled to be discharged from the drain port EX of the linear solenoid valve SLC1 via the oil paths b1, b2, so that the clutch C-1 is released. Further, the other linear solenoid valve SLC3 is controlled for pressure regulation from the condition of being energized to be closed to make a control pressure $P_{SLC3}$ to be zero in the same manner as in the forward third speed. The control pressure $P_{SLC3}$ is output as the engagement pressure $P_{C3}$ from the output port SLC3b and input to the hydraulic servo 43 via the oil path e1, so that the clutch C-3 is engaged. This achieves the forward fifth speed, coupled with the engagement of the clutch C-2.

[Operation in the Forward Sixth Speed]

When, for example, the control unit determines the forward sixth speed from the condition of the forward fifth speed, the linear solenoid valve SLC3 is closed by being energized and the linear solenoid valve SLB1 is controlled for pressure regulation through the electric command from the control unit, while maintaining the pressure regulation condition for the linear solenoid valve SLC2 with the solenoid valve S1 energized and the solenoid valve S2 deenergized in the same manner.

Specifically, a release control of the clutch C-3 is first performed through the control of the linear solenoid valve SLC3 for pressure regulation; specifically, the engagement pressure $P_{C3}$ (control pressure $P_{SLC3}$) of the hydraulic servo 43 of the clutch C-3 is controlled to be discharged from the drain port EX of the linear solenoid valve SLC3 via the oil path e1, so that the clutch C-3 is released. Further, the other linear solenoid valve SLB1 is energized and controlled for pressure regulation from the condition of being deenergized to be closed to make a control pressure $P_{SLB1}$ to be zero in the same manner as in the forward second speed. The control pressure $P_{SLB1}$ is output as the engagement pressure $P_{B1}$ from the output port SLB1b and input to the hydraulic servo 44 via the oil path f1, so that the brake B-1 is engaged. This achieves the forward sixth speed, coupled with the engagement of the clutch C-2.

[Operation in Shift from D to N Range]

Assume, for example, that the driver thereafter decelerates the vehicle and brings the vehicle to a stop at the forward first speed through downshifting thereto according to the vehicle speed. When the shift lever is then placed in the N range position from the D range position, the forward range pressure output port 81b of the manual shift valve 81 (see FIG. 5) is shut off from the input port 81a, while the forward range pressure output port 81b and the drain port EX are brought into communication with each other, specifically, the forward range pressure $P_D$ is drained.

At the same time, a shift lever sensor (not shown) detects that the shift lever is in the N range position and the control unit determines the N range based on the shift lever position. Then, the linear solenoid valve SLC2 and the linear solenoid valve SLC3 are first energized and the linear solenoid valve SLB1 is deenergized to drain the control pressures $P_{SLC2}$, $P_{SLC3}$, $P_{SLB1}$ thereof to zero pressures (the non-output state). Specifically, the hydraulic pressure of each of the hydraulic servos 42, 43, 44, 45 is drained and the clutches C-2, C-3 and the brakes B-1, B-2 are released. Note that the solenoid valve S1 is retained in the energized condition and the solenoid valve S2 is retained in the deenergized condition; specifically, the signal pressures $P_{S1}$, $P_{S2}$ are not output from the solenoid valves S1, S2.

The linear solenoid valve SLC1, on the other hand, is controlled for pressure regulation such that the control pressure $P_{SLC1}$ is gradually decreased to prevent a release shock from being produced when, for example, the clutch C-1 is released rapidly. The control pressure $P_{SLC1}$ is thus finally drained to zero pressures (the non-output state) and the clutch C-1 is released at a mild pace. When the clutch C-1 is also released, the automatic transmission 3 is placed in the neutral condition with all clutches and brakes released.

During the release control with the linear solenoid valve SLC1, the accumulator 30 connected to the input port SLC1a of the linear solenoid valve SLC1 via, for example, the oil path a3 releases, for maintaining pressure, a hydraulic pressure accumulated during the D range to the oil paths a1, a3 on a side closer to the linear solenoid valve SLC1 than the orifice 60. This permits a mild release control of the clutch C-1 using the linear solenoid valve SLC1, which prevents a release shock from being produced during the D-N shift operation from the forward first speed condition.

[Operation in the Reverse First Speed]

If, for example, the shift lever is placed in the R range position through a shift lever operation performed by the driver, the reverse range pressure $P_{REV}$ from the reverse range pressure output port 81d of the manual shift valve 81 (see FIG. 5) is output as described above and the reverse range pressure $P_{REV}$ is input to the input port 24d of the B-2 relay valve 24 via, for example, the oil path 1.

At the same time, the shift lever sensor (not shown) detects that the shift lever is in the R range position and the control unit determines the R range as the shift lever position. Then, the solenoid valve S1 is retained in the energized condition and the solenoid valve S2 is retained in the deenergized condition; specifically, the signal pressure $P_{S2}$ is not output, so that the B-2 relay valve 24 is maintained in the left-hand-half position by the urging force of the spring 24s. This causes the reverse range pressure $P_{REV}$ input to the input port 24c to be supplied to the hydraulic servo 45 of the brake B-2 via the output port 24g and the oil path n, so that the brake B-2 is engaged.

Further, the control unit controls the linear solenoid valve SLC3 for pressure regulation so that the linear solenoid valve SLC3 gradually outputs the control pressure $P_{SLC3}$. The control pressure $P_{SLC3}$ is then output as the engagement pressure $P_{C3}$ from the output port SLC3b and input to the hydraulic servo 43 via the oil path e1. Specifically, the clutch C-3 is engaged at a mild pace. This achieves the reverse first speed, coupled with the locking of the brake B-2.

Note that, when the N range (or the P range) is changed from the R range, the same conditions as in the N range are established. Specifically, the engagement pressure $P_{B2}$ of the hydraulic servo 45 of the brake B-2 is drained via the oil path n, the B-2 relay valve 24, the oil path 1, and the manual shift valve 81 (see FIG. 5) and the engagement pressure $P_{C3}$ of the hydraulic servo 43 of the clutch C-3 is drained from the linear solenoid valve SLC3.

Additionally, if the vehicle speed is detected to be a predetermined speed or more in the forward direction when, for example, the driver places the shift lever in the R range position, the control unit energizes the solenoid valve S2 and keeps the linear solenoid valve SLC3 in the energized condition; specifically, the B-2 relay valve 24 is used to achieve a shutoff so that the reverse range pressure $P_{REV}$ is not supplied to the hydraulic servo 45 of the brake B-2 and the engagement pressure $P_{C3}$ (control pressure $P_{SLC3}$) is not supplied to the hydraulic servo 43 of the clutch C-3. This works as, what is called, a reverse inhibit function that prevents the reverse first speed from being achieved.

[Operations During Solenoids-All-Deenergized Failure]

Operations during a solenoids-all-deenergized failure in the hydraulic control apparatus 1 will be described below. If all solenoid valves (the linear solenoid valve SLC1, the linear solenoid valve SLC2, the linear solenoid valve SLC3, the linear solenoid valve SLB1, the solenoid valve S1, and the solenoid valve S2) run into a deenergized failure (hereinafter referred to as "all-deenergized failure") due to, for example, a short-circuit or an open circuit in the battery during ordinary running with the shift lever placed in the D range, the linear solenoid valve SLC1, the linear solenoid valve SLB1, and the solenoid valve S2, which are of the normally closed type, do not output any hydraulic pressure, while the linear solenoid valve SLC2, the linear solenoid valve SLC3, and the solenoid valve S1, which are of the normally open type, outputs respective hydraulic pressures.

During normal running covering from the forward first speed through the forward third speed, the first clutch apply relay valve 21 has the spool 21*p* locked in the right-hand-half position by the forward range pressure $P_D$ input to the oil chamber 21*c* as described above. Accordingly, the forward range pressure $P_D$ output from the output port 21*i* is input to the input port 22*e* of the second clutch apply relay valve 22 via the oil path k1 and shut off by the second clutch apply relay valve 22 positioned in the left-hand-half position.

If the all-deenergized failure occurs under this condition, the second clutch apply relay valve 22 is repositioned in the right-hand-half position by the signal pressure $P_{S1}$ output from the solenoid valve S1 being input to the oil chamber 22*a* via the oil paths h1, h3 and the forward range pressure $P_D$ input to the input port 22*e* is output from the output port 22*d* and input to the hydraulic servo 41 via the oil path b2, so that the clutch C-1 is engaged. In addition, $P_{SLC2}$ (engagement pressure $P_{C2}$) output from the normally open linear solenoid valve SLC2 is shut off by the input port 22*f* of the second clutch apply relay valve 22 repositioned in the right-hand-half position. Further, with the normally open linear solenoid valve SLC3, the line pressure $P_L$ input to the input port SLC3*a* is substantially directly output as the engagement pressure $P_{C3}$ from the output port SLC3*b* and input to the hydraulic servo 43 via the oil path e1, so that the clutch C-3 is engaged. This engages the clutch C-1 and the clutch C-3 to achieve the forward third speed (see FIG. 2). Specifically, the running condition by the forward third speed is achieved when the all-deenergized failure occurs during running from the forward first speed to the forward third speed.

During normal running covering from the forward fourth speed through the forward sixth speed, the engagement pressure $P_{C2}$ of the clutch C-2 is input, as described above, to the oil chamber 21*d* of the first clutch apply relay valve 21 via the oil path c1, the second clutch apply relay valve 22, the oil path c2, the C-2 relay valve 23, and the oil path c5, so that the spools 21*p*, 21*q* are locked in the left-hand-half position. Consequently, the forward range pressure $P_D$ output from the output port 21*j* is input to the input port 22*h* of the second clutch apply relay valve 22 via the oil path j and thus shut off by the second clutch apply relay valve 22 positioned in the left-hand-half position.

If the all-deenergized failure occurs under this condition, the second clutch apply relay valve 22 is repositioned in the right-hand-half position by the signal pressure $P_{S1}$ output from the solenoid valve S1 being input to the oil chamber 22*a* via the oil paths h1, h3; and the solenoid valve S2 is deenergized to keep the B-2 relay valve 24 in the left-hand-half position, which results in the oil path h4 being shut off, so that the signal pressure $P_{S1}$ of the solenoid valve S1 is not output to the oil path h5; as a result, the C-2 relay valve 23 is also kept in the left-hand-half position. The forward range pressure $P_D$ input to the input port 22*h* of the second clutch apply relay valve 22 is therefore output from the output port 22*g* and input to the hydraulic servo 42 via the oil path c2, the C-2 relay valve 23, and the oil path c3, so that the clutch C-2 is engaged. In addition, $P_{SLC2}$ (engagement pressure $P_{C2}$) output from the normally open linear solenoid valve SLC2 is shut off by the input port 22*f* of the second clutch apply relay valve 22 repositioned in the right-hand-half position. The forward range pressure $P_D$ output to the oil path c2 is, however, output also to the oil path c5 via the C-2 relay valve 23 and then input to the oil chamber 21*d* of the first clutch apply relay valve 21, so that the first clutch apply relay valve 21 remains locked in the left-hand-half position. Further, with the normally open linear solenoid valve SLC3, the line pressure $P_L$ input to the input port SLC3*a* is substantially directly output as the engagement pressure $P_{C3}$ from the output port SLC3*b* and input to the hydraulic servo 43 via the oil path e1, so that the clutch C-3 is engaged. This engages the clutch C-2 and the clutch C-3 to achieve the forward fifth speed (see FIG. 2). Specifically, the running condition by the forward fifth speed is achieved when the all-deenergized failure occurs during running from the forward fourth speed to the forward sixth speed.

When the vehicle is brought to a stop and the shift lever is temporarily placed in the N range position as the all-deenergized failure occurs during the normal running covering from the forward fourth speed through the forward sixth speed, the manual shift valve 81 (see FIG. 5) suspends the output of, and drains, the forward range pressure $P_D$ and, particularly, drains the forward range pressure $P_D$ relative to the normally open linear solenoid valve SLC2 and the input port 21*e* of the first clutch apply relay valve 21. Then, the forward range pressure $P_D$ input to the oil chamber 21*d* via the oil paths j, c2, c5 is drained to release the lock by the forward range pressure $P_D$. In addition, since the signal pressure $P_{S1}$ continuously remains output from the normally open solenoid valve S1, the first clutch apply relay valve 21 has the spools 21*p*, 21*q* repositioned in the right-hand-half position by the signal pressure $P_{S1}$ input to the oil chamber 21*a*.

Note that, under the condition of the N range having the all-deenergized failure, the line pressure $P_L$ is the source pressure and the control pressure $P_{SLC3}$ (engagement pressure $P_{C3}$) substantially equivalent to the line pressure $P_L$ is output from the normally open linear solenoid valve SLC3, so that the clutch C-3 is in the engaged condition. In addition, the clutches C-1, C-2 and the brakes B-1, B-2 are released, though the clutch C-3 is engaged, so that the sun gear S3 and the carrier CR2 turn idly despite the input of reduced speed rotation of the sun gear S2. Therefore, the input shaft 10 and the counter gear 11 are substantially in the neutral condition (see FIG. 1).

If, for example, the driver places the shift lever in the D range position again, the forward range pressure $P_D$ is output from the manual shift valve 81 (see FIG. 5). The forward range pressure $P_D$ is then input to the input port 21*e* of the first clutch apply relay valve 21 repositioned in the right-hand-half position. The forward range pressure $P_D$ is also output from the output port 21*i* to the oil path k1 and input to the hydraulic servo 41 of the clutch C-1 via the input port 22*e* and the output port 22*d* of the second clutch apply relay valve 22 placed in the right-hand-half position and the oil path b2, and the clutch C-1 is engaged; specifically, the same condition is established as in the all-deenergized failure during the running from the forward first speed to the forward third speed and the forward third speed is achieved. Consequently, the vehicle can be restarted even after the temporary stop following the all-deenergized failure, thus achieving the limp-home function that permits, for example, moving to a safe place or a service garage.

DESCRIPTION OF THE PRESENT INVENTION

A principal portion of the present invention will be described below with reference to FIG. 5.

In the hydraulic control apparatus 1 according to the embodiment of the present invention, the linear solenoid valve SLC1 has the input port SLC1*a* connected to the forward range pressure output port 81*b* of the manual shift valve 81 via the oil paths a1, a10, a11 (a first oil path). The linear solenoid valve SLB1 has the input port SLB1*a* connected to the forward range pressure output port 81*b* of the manual shift valve 81 via the oil path a5, oil paths a6, a7, a8, a9, and the oil paths a10, a11 (a second oil path). Accordingly, in the embodiment of the present invention, the oil path for supplying and discharging the forward range pressure to/from the linear solenoid valve SLC1 and the linear solenoid valve SLB1 is shared across a portion between the forward range pressure output port 81b and a branch point C. At this time, the oil paths a10, a11 shared therebetween are a shared oil path. Further, the oil path a1 between the branch point C and the input port SLC1a of the linear solenoid valve SLC1 is a first non-shared oil path and the oil paths a5, a6, a7, a8, a9 between the branch point C and the input port SLB1a of the linear solenoid valve SLB1 are a second non-shared oil path. In addition, the oil paths a6, a7, a8, a9 between the branch point C and a point A of the second non-shared oil path are the discharge delay zone 90.

The discharge delay zone 90 is structured to include the oil path a6, the oil path a7, the oil path 8, and the oil path a9. Specifically, the oil path a6 is connected at the point A to the oil path a5. The oil path a7, on which the orifice 71 is disposed, is connected to the oil path a6. The oil path a9 is connected to the oil path a7 and to the branch point C. The oil path a8 is disposed to extend in parallel with the oil path a7 and connected to the oil paths a6, a9. Further, the check ball 72 is disposed on the oil path a8. Note that the oil path a9 may be connected to the oil paths a1 and a11 at any point other than the branch point C, as long as the point is between the linear solenoid valve SLC1 and the orifice 60.

In accordance with the foregoing arrangements, if, for example, the shift lever is placed in the D range position from the N range position, the forward range pressure $P_D$ is output from the forward range pressure output port 81b of the manual shift valve 81 to the oil path a10. The forward range pressure $P_D$ is then input to the linear solenoid valve SLC1 via the oil paths a10, a11, a1 and to the linear solenoid valve SLB1 via the oil paths a10, a11, a9, a7, a8, a6, a5, respectively. In addition, the check ball 72 is disposed on the oil path a8 and the orifice 71 is disposed on the oil path a7, respectively. Accordingly, the check ball 72 is opened by the forward range pressure $P_D$, so that the supply of the forward range pressure $P_D$ to the linear solenoid valve SLB1 is at a rapid pace as compared with the case of the discharge. Note that, as described above, the forward range pressure $P_D$ supplied to the oil paths a10, a11 is input to the oil chamber 30a of the accumulator 30 via the oil path a3. Then, the accumulator 30 stores therein the forward range pressure $P_D$ to be supplied to the linear solenoid valve SLC1 and the linear solenoid valve SLB1.

After the vehicle has run, the vehicle may, for example, be decelerated and brought to a stop or made to be about to stop through downshifting to the forward second speed according to the vehicle speed. When the shift lever is then placed in the N range position from the D range position, the forward range pressure output port 81b of the manual shift valve 81 is shut off from the input port 81a, while the forward range pressure output port 81b and the drain port EX are brought into communication with each other, specifically, the forward range pressure $P_D$ is drained.

At the same time, the shift lever sensor (not shown) detects that the shift lever is in the N range position and the control unit determines the N range based on the shift lever position. Then, the linear solenoid valve SLC2 and the linear solenoid valve SLC3 are first energized and the control pressures $P_{SLC2}$, $P_{SLC3}$ thereof are drained to zero pressures (the non-output state). Specifically, the hydraulic pressure of each of the hydraulic servos 42, 43, 45 is drained and the clutches C-2, C-3 and the brake B-2 are completely released.

The linear solenoid valve SLC1 and the linear solenoid valve SLB1, on the other hand, are controlled for pressure regulation such that the control pressure $P_{SLC1}$ and the control pressure $P_{SLB1}$ are gradually decreased. The control pressure $P_{SLC1}$ and the control pressure $P_{SLB1}$ are thus finally drained to zero pressures (the non-output state) and the clutch C-1 and the brake B-1 are released at a mild pace.

During the release control with the linear solenoid valve SLC1 and the linear solenoid valve SLB1, the accumulator 30 connected to the input port SLC1a of the linear solenoid valve SLC1 and the input port SLB1a of the linear solenoid valve SLB1 via, for example, the oil path a3 releases, for maintaining pressure, the hydraulic pressure accumulated during the D range to the oil paths a3, a1, a9, a7, a8, a6, a5 on the side closer to the linear solenoid valve SLC1 than the orifice 60. This permits a mild release control of the clutch C-1 and the brake B-1 using the linear solenoid valve SLC1 and the linear solenoid valve SLB1, which prevents a release shock from being produced during the D-N shift operation from the forward second speed condition.

In a known arrangement, for example, having no discharge delay zone 90, specifically, in an oil path configuration directly connecting the point A on the oil path a5 with a point B on the oil path a1, the forward range pressure $P_D$ supplied to the linear solenoid valve SLB1 is rapidly drained when the shift lever is placed in the D range position from the N range position. This invites engagement of the one-way clutch F-1 due to the clutch C-1 left engaged, producing a shift shock by way of the forward first speed.

In this hydraulic control apparatus 1, however, through the simple mechanical arrangement of the orifice 71 interposed in the oil path a7 and the check ball 72 interposed in the oil path a8, the forward range pressure $P_D$ to be discharged is discharged by way of the orifice 71 of the oil path a7 because of the check ball 72 disposed on the oil path a8 being closed by the hydraulic pressure. This allows discharge of the forward range pressure $P_D$ in the oil paths a5, a6, a7, a8, a9 supplying and discharging the hydraulic pressure of the hydraulic servo 44 of the brake B-1 through the linear solenoid valve SLB1 to be delayed relative to discharge of the forward range pressure $P_D$ in the oil path a1 supplying and discharging the hydraulic pressure of the hydraulic servo 41 of the clutch C-1 through the linear solenoid valve SLC1.

Consequently, in, for example, the forward second speed, release of the brake B-1 can be delayed relative to release of the clutch C-1 when the manual shift valve 81 is placed in the N range from the D range based on the shift lever operation. This eliminates the engagement of the one-way clutch F-1 due to the clutch C-1 left engaged when, for example, the brake B-1 is released before the clutch C-1. This allows the N range to be directly changed from the forward second speed without going through the forward first speed from the forward second speed. This prevents a shift shock from being produced when the N range is changed from the D range, contributing to a better shift feeling.

Further, the accumulator 30 is connected to the oil paths a10, a11 (the shared oil path) at a point closer to the side of the linear solenoid valve SLC1 than the orifice 60. This not only, upon change of the N range from the D range, prevents a sudden release shock of the clutch C-1 from occurring as a result of a sudden discharge of, for example, the forward range pressure $P_D$ using the hydraulic pressure accumulated in the accumulator 30, but also delays the release of the clutch C-1 than the release of the brake B-1.

The foregoing has been described for the case in which the N range is changed from the D range. Nonetheless, the forward range pressure $P_D$ is drained likewise even in a case in which the R range or the P range is changed from the D range. Understandably, the present invention that delays the release of the brake B-1 is also effective even in the case of changing from the D range to the R range to establish the reverse first speed, since the reverse first speed is established after being temporarily in the neutral condition.

The embodiment of the present invention described heretofore has been described as an exemplary case in which the hydraulic control apparatus 1 of the automatic transmission is applied to the automatic transmission 3 capable of achieving the forward six speeds and the reverse one speed. The automatic transmission 3 is not the only one to which the embodiment of the present invention can be applied; rather, the automatic transmission may be of any type as long as the type achieves a shift speed higher than that achieved by the engagement of the clutch C-1 and the one-way clutch by the engagement of the clutch C-1 and another friction engagement element (a clutch or a brake). The present invention is useful even in a case, in which, for example, the forward first speed and the forward second speed are both achieved by the engagement of the clutch C-1 and the one-way clutch (e.g. F-1 or F-2) and the forward third speed is achieved by the engagement of the clutch C-1 and another friction engagement element (e.g. C-3), and the shift is made from D to N range in the condition of the forward third speed.

The embodiment of the present invention described heretofore has been described as having the orifice 71 and the check ball 72 as the delay mechanism. Discharge of the hydraulic pressure may nonetheless be delayed only through an electric control using, for example, a linear solenoid valve. In this case, a control mechanism issuing an electric control command corresponds to the delay mechanism on the assumption that a period of time is allowed during which at least the source pressure of the linear solenoid valve to be delayed is delayed.

The embodiment of the present invention described heretofore has been described for the case in which the N range is changed from the forward second speed in which the clutch C-1 and the brake B-1 are engaged. For example, assume a condition in which the N range is changed from the forward third speed in which the clutch C-1 and the clutch C-3 are engaged. Since the source pressure of the linear solenoid valve SLC3 that controls the clutch C-3 is the line pressure $P_L$, in particular, the above-referenced condition can be achieved by using, as the delay mechanism, an electric control mechanism that controls pressure reduction of the control pressure $P_{SLC3}$ of the linear solenoid valve SLC3 is delayed relative to pressure reduction of the control pressure $P_{SLC1}$ of the linear solenoid valve SLC1.

The embodiment of the present invention described heretofore has been described so that the discharge delay zone 90 is disposed across the branch point C and the point A. The discharge delay zone 90 may nonetheless even be disposed, for example, across the point A and the input port SLB1a of the linear solenoid valve SLB1. Specifically, the present invention can be applied as long as the discharge delay zone is disposed on the second non-shared oil path.

The hydraulic control apparatus for the automatic transmission according to the some aspects of the present invention is applicable to automatic transmissions mounted in vehicles, such as passenger cars, trucks, buses, and agricultural machinery and particularly suitable for use in an automatic transmission having a low speed achieved by engagement of a friction engagement element and a one-way clutch. For example, the hydraulic control apparatus is suitable, for example, for one that is required to prevent shock as a result of engagement of the one-way clutch from occurring.

What is claimed is:

1. A hydraulic control apparatus for an automatic transmission achieving a lower medium speed by engaging a first friction engagement element and a second friction engagement element and a low speed lower than the lower medium speed by engaging the first friction engagement element and a one-way clutch, the hydraulic control apparatus for the automatic transmission, comprising:
    a range pressure generating unit outputting a forward range pressure upon a forward range based on a shift lever operation and discharging the forward range pressure upon another shift range;
    a first pressure regulating unit outputting the forward range pressure through pressure regulation to a hydraulic servo of the first friction engagement element;
    a second pressure regulating unit outputting the forward range pressure through pressure regulation to a hydraulic servo of the second friction engagement element;
    a first oil path providing communication of the forward range pressure of the range pressure generating unit with the first pressure regulating unit;
    a second oil path providing communication of the forward range pressure of the range pressure generating unit with the second pressure regulating unit; and
    a delay mechanism delaying discharge of the second oil path than discharge of the first oil path when the another shift range is changed from the forward range based on the shift lever operation and the range pressure generating unit discharges the forward range pressure.

2. The hydraulic control apparatus for an automatic transmission according to claim 1, wherein
    the delay mechanism is disposed on the second oil path.

3. The hydraulic control apparatus for an automatic transmission according to claim 2, wherein:
    the delay mechanism comprises:
        a first orifice; and
        a one-way valve disposed in parallel with the first orifice.

4. The hydraulic control apparatus for an automatic transmission according to claim 2, wherein
    the first oil path comprises:
        a shared oil path connected to the range pressure generating unit and sharing supply and discharge of a hydraulic pressure with the second oil path; and
        a first non-shared oil path branched from the shared oil path and connected to the first pressure regulating unit;
    the second oil path comprises:
        the shared oil path; and
        a second non-shared oil path branched from the shared oil path and connected to the second pressure regulating unit, wherein
    the delay mechanism is interposed in the second non-shared oil path.

5. The hydraulic control apparatus for an automatic transmission according to claim 4, further comprising:
    a second orifice interposed in the shared oil path; and
    an accumulator disposed on a side closer to the first pressure regulating unit than the second orifice and connected to the shared oil path.

6. The hydraulic control apparatus for an automatic transmission according to claim 1, wherein:
    the delay mechanism comprises:
        a first orifice; and
        a one-way valve disposed in parallel with the first orifice.

7. The hydraulic control apparatus for an automatic transmission according to claim 6, wherein
    the first oil path comprises:

a shared oil path connected to the range pressure generating unit and sharing supply and discharge of a hydraulic pressure with the second oil path; and a first non-shared oil path branched from the shared oil path and connected to the first pressure regulating unit;

the second oil path comprises:

the shared oil path; and a second non-shared oil path branched from the shared oil path and connected to the second pressure regulating unit, wherein the delay mechanism is interposed in the second non-shared oil path.

8. The hydraulic control apparatus for an automatic transmission according to claim 7, further comprising:

a second orifice interposed in the shared oil path; and an accumulator disposed on a side closer to the first pressure regulating unit than the second orifice and connected to the shared oil path.

* * * * *